United States Patent [19]

Haury et al.

[11] 3,911,328

[45] Oct. 7, 1975

[54] SYSTEM PROVIDING POWER SUPPLY CONNECTIONS AND INTERCONNECTIONS FOR LOGIC MODULES

[75] Inventors: André Lucien Haury, Le Raincy; Michel Louis Duclos, Verneuil L'Etang, both of France

[73] Assignee: La Telemecanique Electrique, Nanterre, France

[22] Filed: Jan. 9, 1974

[21] Appl. No.: 432,127

[30] Foreign Application Priority Data

Jan. 16, 1973 France .............................. 73.01388

[52] U.S. Cl. ........ 317/118; 174/72 A; 317/101 CB; 317/122; 339/22 R

[51] Int. Cl. .......................... H02b 1/04; H05k 5/02

[58] Field of Search ...... 174/72 A; 317/99, 101 CB, 317/101 DH, 118, 120, 122; 339/22 R, 22 B, 91 R, 222, 256 SP, 258 S

[56] References Cited

UNITED STATES PATENTS

| | | | |
|---|---|---|---|
| 3,365,694 | 1/1968 | Parker | 339/91 R |
| 3,373,319 | 3/1968 | Robertis | 317/101 DH |
| 3,536,961 | 10/1970 | Ludvik | 174/72 A |
| 3,614,537 | 10/1971 | Introvigne | 317/99 |
| 3,746,936 | 7/1973 | Coffey | 317/120 |
| 3,763,401 | 10/1973 | Ransom | 317/118 |
| 3,821,688 | 6/1974 | Larsik | 339/22 R |

*Primary Examiner*—Gerald P. Tolin
*Attorney, Agent, or Firm*—Karl W. Flocks

[57] ABSTRACT

The invention relates to a power supply and interconnecting system or arrangement for logic modules. The logic modules are provided with connecting members on two opposite faces thereof so that they can either be disconnected, or the connections to their pins can be undone, depending on their orientation when inserted into a socket-shaped support. The system or arrangement is applicable to electrical, optielectrical, or pneumatic control systems for automated industrial equipment.

2 Claims, 3 Drawing Figures

SYSTEM PROVIDING POWER SUPPLY CONNECTIONS AND INTERCONNECTIONS FOR LOGIC MODULES

The invention relates to a system or arrangement which provides power to supply connections and interconnections for logic blocks or modules, such systems being used for process control, or the control of automated equipment in industry, and in particular for sequentially operated automatic equipment, where data-processing is mainly the responsibility of electronic circuits. The invention constitutes an improvement to the system forming the subject of Patent Application No: 72.11719, entitled "System providing power supply connections and interconnections for logic blocks", and filed by the present Applicant on April 4, 1972.

According to the parent application, the power supply and interconnecting system employs static logic modules provided on one of their faces with interconnecting and power supply pins, employs sockets capable of holding the modules and supplying them with power, and channels suitable for guiding the interconnecting conductors.

In the main application was described a power supply and interconnecting system for logic modules which relied on an intermediate base which allowed a logic module to be disconnected quickly, without having to undo the connections one-by-one.

The justification for this arrangement, which provides incontestable advantages with regard to maintenance time, is the saving made when automated systems are used to control large installations, such as chemical plant or mass-production factories.

Nevertheless, it is a fact that, in every installation, some circuits are of less importance than others, by reason, for example, of the existence of parallel circuitry, and that certain circuits also have less work to do than others, with the result that, for a given standard of reliability, the likelihood of faults may be considered to be zero.

The system according to the main application is thus only fully justified if it is used with a system capable of answering every category of requirement.

Furthermore, the significant reduction in the size of electronic components would have no practical results if it were not accompanied by a simultaneous reduction in the size of the apparatus and systems employing such components.

Finally, it is obvious that the designer will be able to arrange his circuit layout successfully, and allow maintenance staff to carry out their jobs properly, if all the logic blocks or modules likely to be used are interchangeable.

The present application thus aims to enable the use of a logic module of the type used in the main application with a simplified interconnecting and power supply system of smaller format, while retaining the same desirable characteristics with regard to quality, reliability, fitting, and ease of identification.

In accordance with the present invention, this is achieved by reason of the fact that each module has, on a second of its faces, other connecting pins which allow it to be supplied with power by conductors positioned at the bottom of a flexible socket, the cross-sectional shape of which is approximately that of a U, the walls forming the limbs of which have means for guiding the modules and holding them in place, as well as means for forming, in conjunction with a neighbouring socket, a duct which serves to group together the interconnecting conductors.

In accordance with a feature of this invention, the guide means are oblong openings disposed perpendicular to the bottom of the socket. Adopting this measure has the advantage that the socket can be produced by an extrusion process rather than by a more expensive moulding process.

In accordance with another feature of this invention, the means intended to form the duct comprise two walls disposed substantially perpendicular to the walls forming the limbs of the U, one of which is situated close to the bottom, while the other is situated close to the free end of the wall and includes cut outs intended to guide the interconnecting conductors into the duct.

This arrangement allows a channel to be produced to group together the conductors without the necessity of using a special part for this purpose.

In accordance with a further feature, the side-walls of the module which face the walls of the socket are provided with an elongated projection intended to cooperate with the oblong openings in the walls after the latter have been deformed.

This design has the advantage that the modules are effectively held in place, and their walls strengthened, which is necessary when they are handled whilst the connecting terminals are being plugged in.

In order that the invention may be more readily understood, reference will now be made to the accompanying drawings, in which.

Figure 1:
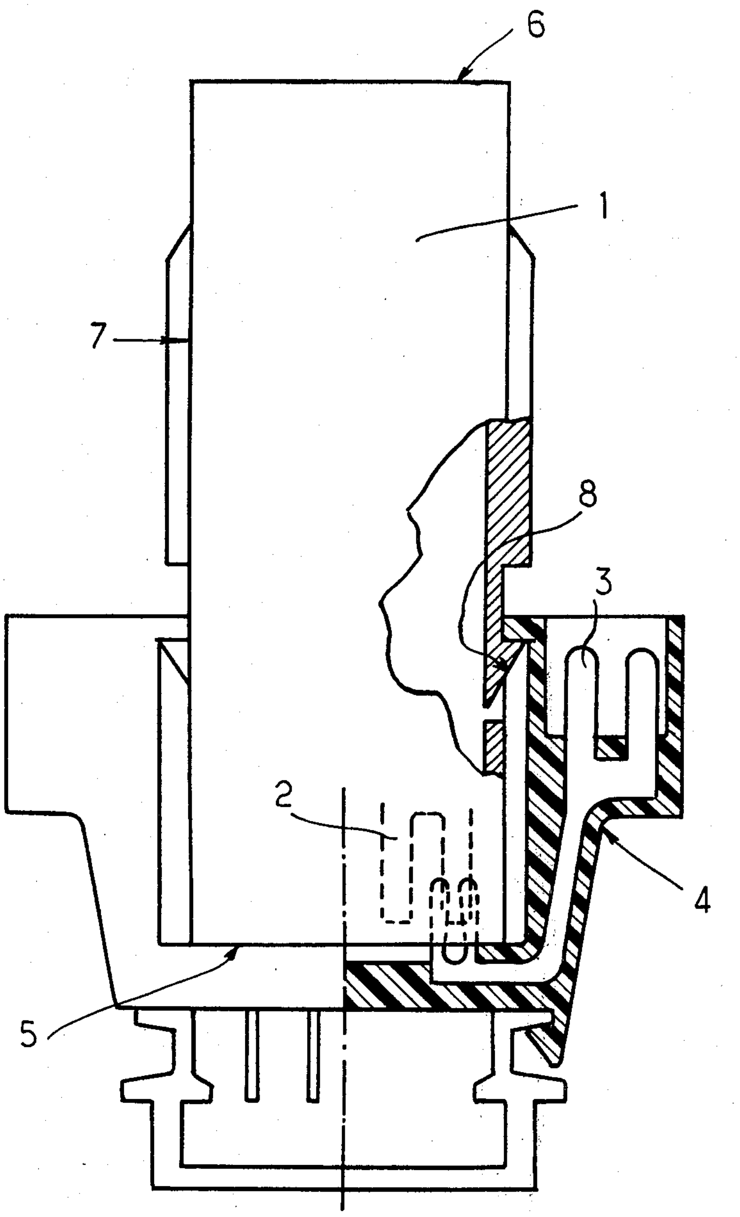
FIG. 1 shows, in partial section, a power supply and interconnecting system according to the parent application, as a reminder.

In FIG. 1 can be seen a logic module 1 intended to be associated with a base 4, i.e. inserted in a socket in the base 4, in such a way that the connecting members or means of the module co-operate with those of the base 4 at the bottom of the socket, and in particular, feed out signal voltages to interconnecting members such as 3.

All the connecting members 2, i.e. both those for supplying power and for interconnection, are grouped on the same lower or rear face 5 of the module, and the opposite upper or front face 6 only bears an identification tab, and posssibly also an indicator light.

The side-walls 7 are used for gripping purposes, and by pressing in on them a locking catch 8 is caused to retract.

Figure 2:
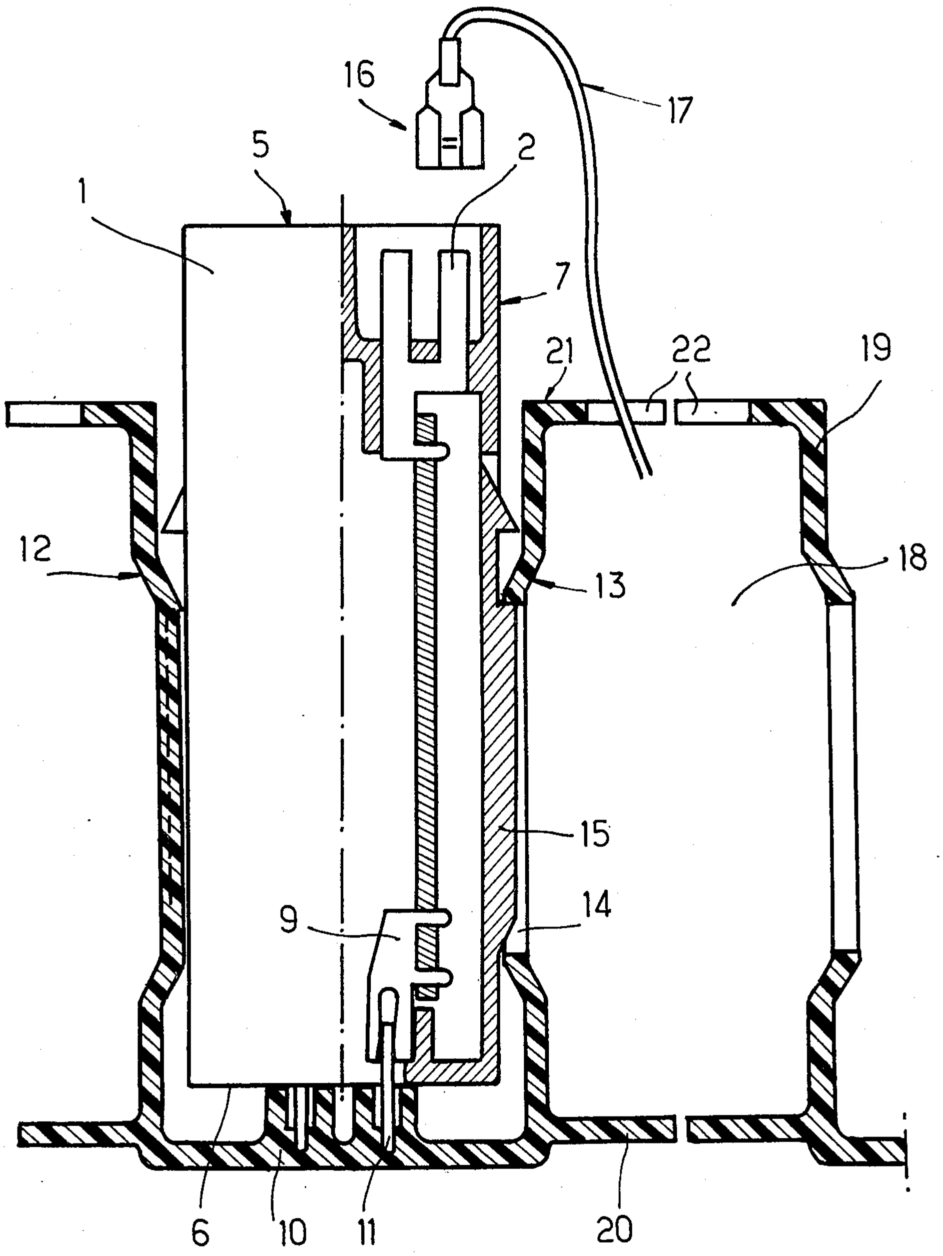
FIG. 2 shows all the parts forming the power supply and interconnecting system according to one embodiment of the present invention, sectioned along the line XX′ in FIG. 3, with the exception of the logic module, only one half of which is sectioned; and, FIG. 3 is a view from above, in partial section, of the system shown in FIG. 2.

A simplified version of such a device or arrangement which embodies the present invention is shown, partly in section, in FIG. 2, in which similar members have been given similar reference numerals.

With this type of arrangement, provision has been made for the module to co-operate with a socket 10 in the base after the module has been turned over through 180° relative to the position shown in FIG. 1. The face 5 thus becomes the upper or front face of the module, and the connecting members 2 in the face 5 are thus situated in the upper or front wall of the module, connections to neighbouring modules being made by means of conductors 17 having unpluggable terminals 16.

To supply power to the modules, elongated conductors 11 having prongs capable of passing through openings in the lower or rear face 6 of the module opposite to the face 5 are provided at the bottom of the socket 10 to co-operate with other connecting members such as 9.

The socket 10 also serves to hold the logic modules 1 in place. To this end, the socket 10 is generally U-shaped in cross-section, which is achieved by extrusion, and the vertical side walls 12 and 13 which form the limbs of the U extend a certain way up the side faces 7 of the module.

Figure 3:
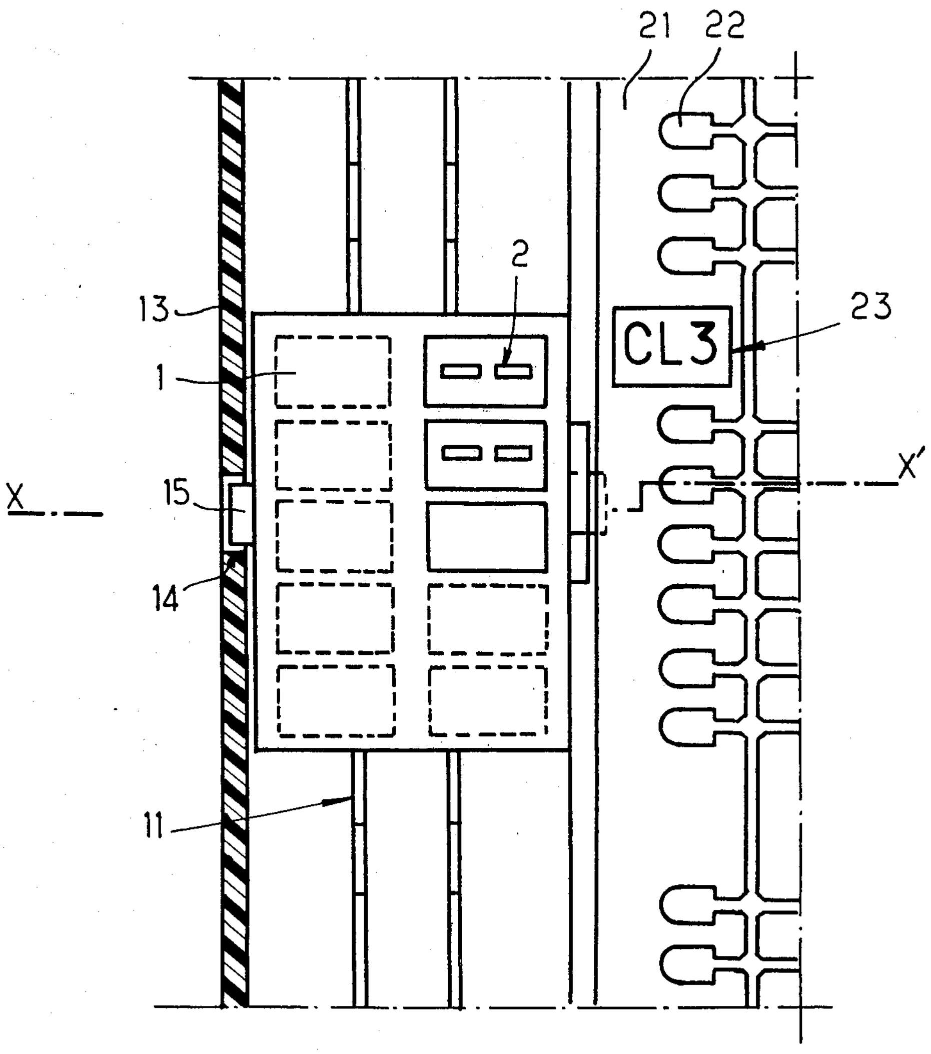

Each of the walls 12 and 13 forming the limbs has formed therein generally oblong openings or slots 14 disposed perpendicular to the bottom of the socket, which slots 14 are each intended to guide, and hold in place, a rib 15 integral with each side wall 7 of the module (see also FIG. 3).

To insert the module between the limbs or side walls 12 and 13 of the socket 10, it is necessary to spread these side walls apart, which is made possible by selecting a material for them which has sufficient resilience.

As the number of conductors 17 may be considerable, and it is important that they should all be protected, provision has been made, as in the main application, for these conductors to be ducted.

Since ducting has the disadvantage that it is not necessarily of the right size, a considerable amount of space is usually lost by using it, and fixing it in place involves extra labour costs. Provision has therefore been made to create a partially enclosed duct 18, by making use of a neighbouring socket 19. The existence of this duct is a result of the fact that each vertical limb of the U is provided with two walls which are arranged substantially perpendicular to the wall which forms the limb 13, one of which perpendicular walls 20 is situated near the lower end of the wall 13 and the other of which, namely the wall 21, is situated near the free or upper end of the wall 13.

Cut-outs 22, visible in FIGS. 2 and 3, are made in the upper wall 21 to serve as guides for conductors, such as the conductors 17. These cut-outs, because they perforate the wall 21, can only be made in certain longitudinally extending zones of the wall, in order to leave portions or spaces between these zones to which marking tabs 23 may be attached, which tabs are necessary since the face 6 of the module which carries markings is face-down in the socket 10, and is no longer visible from the front or upper end of the socket.

The socket 10 is also provided with means, not shown, enabling it to be attached to a wall or chassis, with blanking members which enable areas not occupied by modules to be masked off, and with connecting members, the purpose of which is to connect the power supply conductors 11 to a voltage source. These members may either be arranged at the end of the socket, or plugged in a similar way into the modules.

It is clear that the proposed solution may be applied with advantage to electronic components, but it may also be successfully applied to components of other types. Thus, housings containing logic modules might alternatively contain miniature relays, opto-electronic logic circuits, or even pneumatic modules of a suitable size. In the latter cases, at least some of the supply and interconnecting conductors are replaced by, or comprise, optical fibres or flexible tubes or other members to lead information in or out, and/or to connect to an appropriate source or supply.

We claim:

1. A control system for automated industrial equipment, said system comprising a support member provided with a plurality of parallel socket-like elongated channels of substantially U-shaped cross-section, a plurality of logic modules detachably mounted on said channels, power supply conductors and interconnecting conductors, each of said logic modules having first and second end faces and first and second side walls, first connecting members fixedly mounted on said first end faces and detachably attached to the power supply conductors, second connecting members fixedly mounted on said second end faces and detachably attached to the interconnecting conductors, positioning and clamping means on said first side walls, each of said socket-like elongated channels having a bottom and first and second resilient side limbs, each of said side limbs having inner and outer surfaces, a bottom end and an upper end, wall portions projecting from the bottom end and from the upper end of each side limb substantially perpendicular thereto, said power supply conductors being fixedly mounted in the bottom of the channels, further positioning and clamping means on the inner surfaces of said first limbs, said further positioning and clamping means cooperating with the positioning and clamping means of the logic modules, the said projecting wall portions of each channel cooperating with the projecting wall portions of other channels to form a substantially closed duct wherein the said interconnecting conductors are grouped together.

2. A control system as claimed in claim 1, wherein the said positioning and clamping means include a rib, whereas the said further positioning and clamping means include a slot, said slot holding said rib.

* * * * *